Aug. 25, 1964  J. D. TEJA  3,146,099
EDGE-BONDING OF DIFFERENT METALS
Filed June 13, 1960
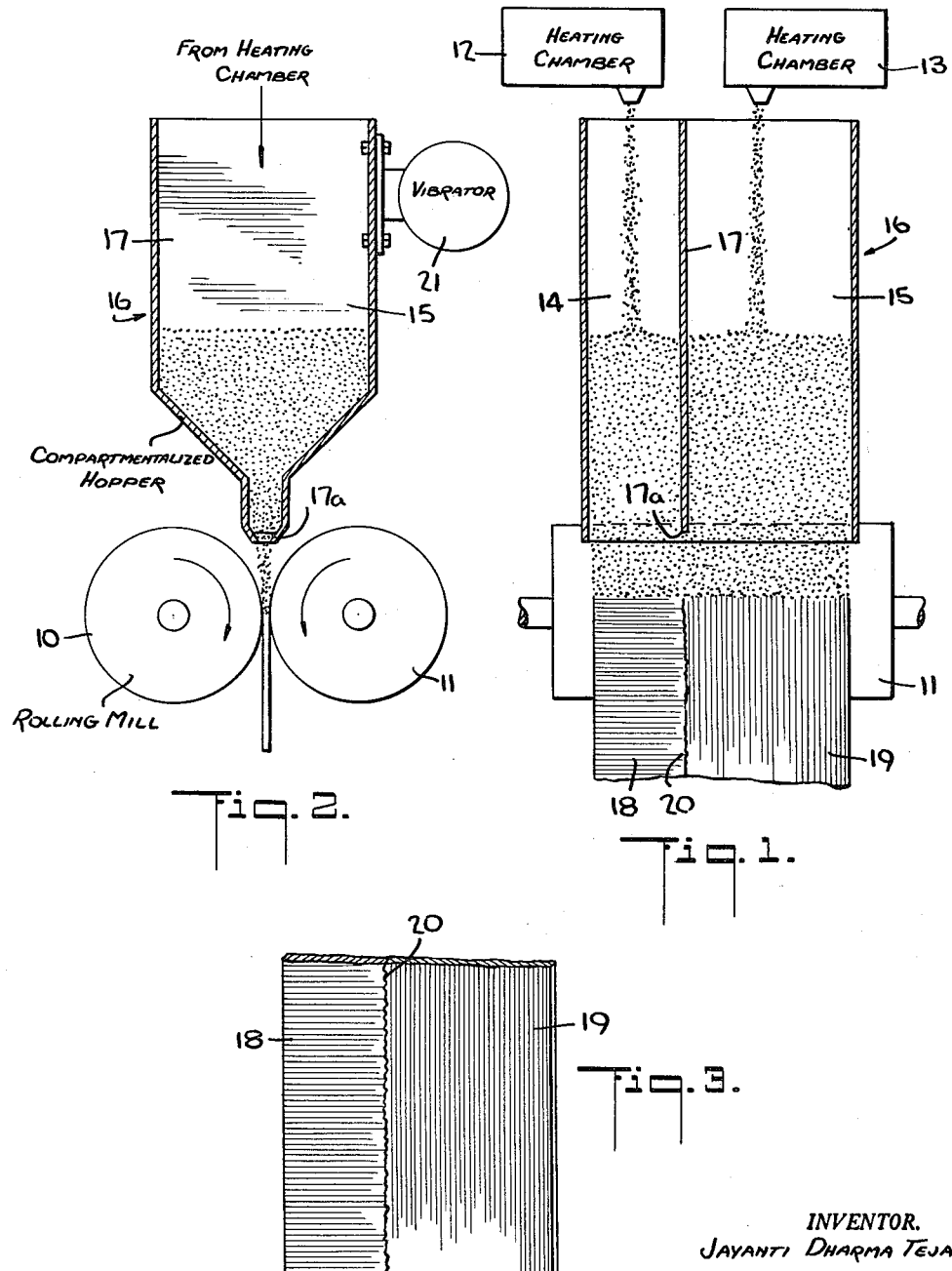
INVENTOR.
JAYANTI DHARMA TEJA
BY
ATTORNEYS

3,146,099
EDGE-BONDING OF DIFFERENT METALS
Jayanti Dharma Teja, Syosset, N.Y., assignor to De Vitre-Teja Industries Co., Geneva, Switzerland, a partnership
Filed June 13, 1960, Ser. No. 35,812
6 Claims. (Cl. 75—208)

This invention relates generally to the forming of metals and more particularly to a technique and apparatus for edge-bonding strips constituted by like or different metals to form a composite strip.

The need exists for composite metallic strips and sheets wherein the edge of one metal strip is bonded to the edge of another and different metal strip. Such edge-bonded combinations are desirable when one seeks to make best use of the respective properties of the different metals in a given application. For example, copper may be edge-bonded to iron or steel so as to exploit the high conductivity of copper in one section of the composite strip while maintaining high strength and low cost by using steel in the other section. Also in order to form composite sheets of great width from metallic sections, it is necessary to edge-bond the sections together.

Conventional techniques for edge-bonding, such as soldering, brazing or welding, have many practical disadvantages when used to combine different metals. Not only are such bonding techniques relatively expensive but the bond produced thereby does not provide an effective and certain interlock of the metals. Moreover, where the metals are metallurgically dissimilar, the welding or soldering metals and fluxes, while operative with one of the metals, may be less effective with the other metal or in some instances completely ineffective.

Accordingly, it is the principal object of the present invention to provide a method and apparatus for edge-bonding strips of metal of the same composition or strips having widely different metallurgical characteristics.

More specifically it is an object of the invention to effect edge-bonding by simultaneously hot-rolling two parallel streams of particles of the different metals dynamically to compact the particles and produce a composite strip in which the edges of the two metals are securely and permanently joined together.

Also an object of the invention is to provide edge-bonded strips in which the bond between the separate metals is stronger than the weaker of the two metals joined thereby.

A major advantage of the invention is that the bond does not rely for its strength solely on metallurgical interaction between the two materials, that is, by diffusion of one metal into another. The invention effects, in addition to such interaction, a mechanical interlock of the deformed metallic particles which materially augments the strength of the bond.

Thus metals, which are normally impossible to alloy and are almost totally immiscible in the molten state, can be strongly bonded by the present invention. The invention, however, is not limited to the edge-bonding of metals which are metallurgically dissimilar, such as aluminum and lead. In the case of metallurgically similar metals, the mechanical bonding is supplemented and reinforced by true metallurgical bonding.

A further object of the invention is economically and efficiently to produce a composite edge-bonded strip having improved metallurgical properties.

Briefly stated, these objects are attained by heating particles of the different metals above their respective recrystallization temperatures and then concurrently hot-rolling parallel streams of the heated particles in abutting relation so as to dynamically consolidate the particles and thereby form a composite strip in which the adjacent edges of the metal sections are bonded together.

For a better understanding of the invention as well as other objects and further features thereof, reference is had the following detailed description to be read in conjunction with the accompanying drawing, wherein like components in the various views are identified by like reference numerals.

In the drawings:

FIG. 1 is a front view, partly in section, of an arrangement in accordance with the invention to produce a composite strip.

FIG. 2 is a side view of the hopper and roll arrangement shown in FIG. 1.

FIG. 3 is a sample composite strip produced by the arrangement.

In the copending application Serial No. 15,832, filed March 18, 1960, entitled "Process for Working Metal," there is disclosed a novel process for forming metal products wherein particles of the metal to be shaped are preheated and then fed between the opposing rolls of a mill, the temperature of the particles or powders during rolling being above the recrystallization point of the particles and preferably below the fusion point. It has been demonstrated that superior results are attained when the particles are above or have one dimension above powder size. This metal sheet or strip resulting from this process has markedly improved properties as compared to conventionally formed metal products.

The edge-bonding technique according to the present invention is basically a hot-rolling process wherein two streams of heated particles of different metals are concurrently and dynamically consolidated in a rolling mill in side-by-side relation whereby the composite strip which emerges from the mill consists of two strips firmly bonded at the interface therebetween. In the case of edge-bonding, instead of producing a continuous strip of material from one type of metal powder or metallic particles, two different metals are used, the metallic particles in the streams thereof interflowing and commingling at the abutting edges thereof in the mill whereby the strips are joined together when the streams of particles are hot-rolled.

As shown in FIG. 1, the apparatus used in edge-bonding comprises a rolling mill formed by rolls 10 and 11 turning in opposite directions. Metal particles heated in separate heating chambers 12 and 13 are fed vertically into separate compartments 14 and 15 of a hopper 16 which funnels the two streams of particles into the rolling mill. A baffle 17 divides the hopper into the two compartments. It is to be understood that the rolls may be fed at any suitable angle and that the invention is not limited to the vertical feed arrangement shown herein.

The heating chambers act to bring the temperatures of the metal particles above their recrystallization temperature so that they will consolidate readily when rolled. The chambers may be in the form of electrically heated furnaces, fuel or gas fired furnaces or any other means commonly available for the purpose.

In the following table examples are given of metals which may be treated in the heater, the recrystallization temperature of each metal and its rolling temperature being specified.

| Metal | Recrystallization point, ° C. | Rolling temperature, ° C. |
| --- | --- | --- |
| Lead | 20 | 30 |
| Aluminum | 150 | 600 |
| Copper | 390 | 800 |
| Columbium | 1,050 | 1,300 |
| Molybdenum | 900 | 1,300 |
| Titanium | 1,100 | 1,000 |
| Zirconium | 800 | 900 |
| Tantalum | 1,050 | 1,300 |
| Stainless steel | [1] 600 | 1,200 |
| Iron | 450 | 800 |

[1] Approx.

While the system may be used with particles of powder size, it has been found that good results are also obtained when the particles are above or at least have one dimension larger than "powder size" and that savings in cost and superior metallic properties result therefrom. As defined by the American Society for Metals, powder consists of particles from 1 to 1,000 microns. Hence the present invention also contemplates the use of particles above the maximum powder size and for this purpose the particles derived from the molten metal may take the form of chunks, granules, shot, pellets, needles, fibers, shavings or turnings, wire or wool.

In some instances, it is not necessary to heat both powders since one can be above its recrystallization temperature at room temperature. Thus, for lead and aluminum, the aluminum is heated to 600° C., and the lead is used at room temperature. Both materials are simultaneously dumped into separate compartments 14 and 15 in the hopper 16 onto the moving rolls 10 and 11.

It will be noted that the arrangement of baffle 17 is such that gross mixing of the powders on either side of the hopper is prevented. However, a certain amount of lateral mixing of the powders is required immediately before the powders enter the rolls. Thus, instead of having the lower end 17a of the baffle conform precisely to the shape of the rolls at the point of powder entry into the rolls, it is instead cut slightly short, as shown in FIG. 1, so that a limited amount of edgewise mixing of the parallel powder streams can occur at this point. In this way, the deformed powder particles of each of the two metals which are hot-rolled commingle and interlock to some extent and form a mechanical bond. Since the metals are also hot and under considerable pressure between the rolls, rapid diffusion and metallurgical bonding also takes place between the two materials. The composite strip which emerges from the rolls is constituted, as shown in FIG. 3, by a solidified section 18 of one metal and a solidified section 19 of the other metal, the two sections being bonded edgewise at 20 along their abutting edges. The bond is both a metallurgical and mechanical interlock of the two metals and is stronger than the weaker of the two metals. For example, iron and copper which have been edge-bonded according to the invention exhibit a bond strength of 40,000 p.s.i., the bond failing in the copper.

The particles in the hopper 16 are agitated by a vibrator 21 which may in practice be a magnetostriction transducer, an electromagnetic device or any other suitable means. The purpose of the vibrator shown in FIG. 2 is twofold; it permits uniform flow of the powders through the hopper and promotes the necessary mixing of the powder before entry between the rolls 10 and 11. In some instances, other techniques must be used to promote free flow of the powders through the heater and hopper. Where chemically pure metals are heated, there is a tendency for them to agglomerate during the heating operation despite agitation thereof so that they no longer flow uniformly, as desired, but rather tend to drop into the hopper as large aggregates. This interferes with the rolling process in that the strip produced may be of non-uniform width and have anisotropic mechanical properties.

To promote uniform flow of the powders and eliminate agglomeration during heating, a simple expedient is pre-oxidation of the powders so as to form an oxide film on their surfaces which inhibits agglomeration but does not in any way effect consolidation of the powders during the rolling operation or the mechanical properties of the finished strip. The pre-oxidation need not be a separate processing step but can be integrated with the heating operation; e.g., by passing air over the powders in the heater.

In the case of aluminum, a satisfactory pre-oxidation treatment, i.e., one which completely eliminates any tendency to agglomeration consists of heating the powders for 20 minutes in air at 600° C., the same temperature as used in rolling. Other methods available to prevent agglomeration of the powders includes the use of a rotary tube heater which tumbles the particles about during heating so that they do not remain in contact long enough to sinter together. One may also use powders of larger diameter. Powder particles in such instances are not in as intimate contact with each other as are the fine powders (—20 mesh) used in the aluminum-lead edge-bonding working described herein. As a result, larger particles show a lesser tendency to agglomerate than do fine particles.

It should be noted that the technique is not limited to batchwise operation. The length of edge-bonded strip produced is limited only by the supply of preheated powders or particles available. Thus by using powder pre-heating furnaces of great enough capacity, strip of almost unlimited length can be produced. It is also possible to produce the composite strip in a continuous system as is disclosed in the copending application entitled "Continuous System for Fabrication Metal Products," Serial No. 35,813, filed June 13, 1960.

In edge-bonding, it is essential that the powders from which each of the two different materials are fabricated be subjected to pressures which will result in their satisfactory consolidation. Several ways are available to accomplish this result. For example, the ratio of the widths of compartments 14 and 15 in which each of the two materials are poured in the hopper may be varied. Thus, one or other of the powder fabricated strips may be made to assume a greater portion of the rolling load.

In the case of aluminum and lead, a ratio of 2 parts lead to 3 parts aluminum gives satisfactory results, although other ratios are possible. By varying powder particle size or shape so as to change the nip angle of the powders, greater particle deformation and consequently greater powder reduction ratios are obtained. The criteria for whether or not sound strip is produced from any given powder is believed to be the powder reduction ratio, defined as the powder height at the point of incipient consolidation divided by the final strip thickness.

A powder reduction ratio of 4 to 8 usually results in the production of satisfactory strip in hot powder rolling. Hence by varying the powder characteristics, one may bet equal or comparable consolidation for both materials. The obvious starting point in choice of materials for edge-bounding would be to select powders which are somewhat alike as regards mesh fraction size, distribution and particle shape. In practice, we have edge-bonded aluminum and lead powders having the following characteristics:

| Material | Lead | Aluminum |
| --- | --- | --- |
| Particle shape | Irregular | Irregular. |
| Mesh fraction distribution: | | |
| +100 | 65.2 w/o | 31.6. |
| 100/140 | 32.5 | 39.0. |
| 140/200 | 1.6 | 12.1. |
| 200/270 | 0.2 | 2.1. |
| 270/325 | 0.1 | 1.7. |
| —325 | 0.4 | 13.5. |

The aluminum powder was heated to a temperature of 600° C. whereas the lead powders were used at room temperature. Powders were poured simultaneously onto 6″ diameter rolls with a 6″ diameter face, arranged to accept a vertical powder feed. The roll speed used was 15.7 f.p.m., although faster or slower speeds are feasible depending upon the rolling characteristics of the individual powders. In the case of the aluminum-lead system, roll lubrication appears to be undesirable, the lead strip wrinkling badly as it emerged from the mill. When no lubrication or minimal lubrication is used, both strips emerge perfectly flat with a straight, uniform edge-bond as shown in FIG. 3. Lubrication may be of benefit however in cases where the powders tend to stick to the rolls so as to interfere with the rolling operation.

With lead and aluminum, the edge-bond is uniform and can resist the effects of a 50% cold reduction. Indeed, the cold rolling operation improves the strength of the bond. Rupture of the bond usually occurs in the lead, the bond strength exceeding the strength of the weaker material. Tensile data are given below.

*Strength of Aluminum-Lead Edge Bond Transverse to Rolling Direction*

|  | As Rolled | Reduced 50% |
|---|---|---|
| Ultimate tensile strength, p.s.i. | 1,500 | 2,900 |
| Elongation, percent | 2.0 | 0.6 |

Combinations of iron and copper require heating and rolling of the powders in a protective atmosphere to avoid oxidation of the powders. This operation is in contrast to lead and aluminum edge-bonding, an operation which can be carried out in air since the temperatures and properties of the powders are such that excessive oxidation does not occur.

It is to be understood that the invention also encompasses composite strips of more than two strip sections. Thus by the use of three compartments in the hopper and three streams of particles of different metal, a tri-metal composite strip may be produced.

The edge-bonding technique disclosed herein may also be used to bond together parallel strips of solid metal, such as strips produced by the continuous system disclosed in the copending application noted above or by any other means. To accomplish this result, a stream of heated particles is caused to flow in a channel or channels between adjacent edges of two or more parallel strips, the strips and the particle stream being fed through rollers to compact the particles and at the same time to interconnect the two solid strips. In practice the flow of particles should overlap the adjacent edges of the strips and thereby effectively bond them together in the hot-rolling mill. Thus it becomes possible to form sheets and strips of very broad width by the edge-bonding technique and in this case the strips and particles are all of the same material.

Thus while there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. The method of forming an edge-bonded composite metal strip constituted by sections of different metallic compositions comprising the steps of heating particles of the different metals above their respective recrystallization temperatures, and hot-rolling parallel streams of said different particles concurrently in abutting edge-to-edge relation dynamically to consolidate said particles and thereby form said composite strip.

2. The method of forming a composite edge-bonded metal strip constituted by sections of different metallic composition joined along edges thereof, comprising rolling parallel streams of particles of the different metals at temperatures above their respective recrystallization temperatures, said streams being disposed in abutting edge-to-edge relationship, thereby dynamically consolidating said particles and forming said composite strip.

3. The method of claim 2 in which at least the particles of one of said metallic compositions are of larger than powder size.

4. The method of claim 2 in which the particles of both of said metallic compositions are of larger than powder size.

5. Apparatus for forming an edge-bonded composite metal strip constituted by sections of different metallic composition comprising separate chambers to store particles of the different metals above their respective recrystallization temperatures, means to direct said particles from the chambers into parallel coplanar streams in abutting relation, and rolling means to hot roll said parallel streams concurrently in coplanar abutting relationship thereby to form a solid composite strip in which the adjacent edges of the metallic sections are bonded together.

6. The apparatus of claim 5 in which said rolling means comprises a pair of cylindrical rolls spaced apart to form a nip therebetween to which said directing means supplies the particles, the axes of said rolls extending parallel to the planes defined by movement of the particles of said coplanar streams.

References Cited in the file of this patent

UNITED STATES PATENTS

| 836,389 | Wadsworth | Oct. 12, 1909 |
| 2,028,233 | Naeder | Jan. 21, 1936 |
| 2,133,291 | Gordon | Oct. 18, 1938 |
| 2,341,732 | Marvin | Feb. 15, 1944 |
| 2,683,305 | Goetzel | July 13, 1954 |
| 2,760,229 | Cheney | Aug. 28, 1956 |
| 2,882,554 | Heck | Apr. 21, 1959 |
| 2,925,337 | Kalling et al. | Feb. 16, 1960 |

FOREIGN PATENTS

| 798,793 | Great Britain | July 30, 1958 |